US012797842B2

(12) United States Patent
Bergstedt et al.

(10) Patent No.: US 12,797,842 B2
(45) Date of Patent: Nov. 17, 2026

(54) FLUID DETECTION CIRCUIT FOR FLUID EJECTION HEAD

(71) Applicant: Brady Worldwide, Inc., Milwaukee, WI (US)

(72) Inventors: Steven W. Bergstedt, Lexington, KY (US); Patricia A. Clore, Lexington, KY (US)

(73) Assignee: BRADY WORLDWIDE, INC., Milwaukee, WI (US)

( * ) Notice: Subject to any disclaimer, the term of this patent is extended or adjusted under 35 U.S.C. 154(b) by 536 days.

(21) Appl. No.: 18/401,973

(22) Filed: Jan. 2, 2024

(65) Prior Publication Data

US 2024/0131504 A1 Apr. 25, 2024

Related U.S. Application Data

(63) Continuation-in-part of application No. 17/205,016, filed on Mar. 18, 2021, now Pat. No. 11,896,971.

(51) Int. Cl.
*B01L 3/02* (2006.01)
*G01V 3/02* (2006.01)

(52) U.S. Cl.
CPC ................ *B01L 3/021* (2013.01); *G01V 3/02* (2013.01); *B01L 2200/026* (2013.01); *B01L 2200/04* (2013.01); *B01L 2300/0645* (2013.01); *B01L 2300/0663* (2013.01)

(58) Field of Classification Search
CPC ............... B01L 3/021; B01L 2200/026; B01L 2200/04; B01L 2300/0645; B01L 2300/0663; B01L 3/0268; B01L 2200/143; B01L 2300/0829; G01V 3/02; B41J 2/04541; B41J 2/04555; B41J 2/0458; B41J 2/14153; B41J 2002/14354; B41J 2002/14459; G01N 35/1016; G01N 2035/1041
See application file for complete search history.

(56) References Cited

U.S. PATENT DOCUMENTS

| | | | |
|---|---|---|---|
| 6,084,605 | A | 7/2000 | Yaji |
| 6,310,641 | B1 | 10/2001 | Mrvos et al. |
| 6,652,053 | B2 | 11/2003 | Imanaka et al. |
| 6,871,925 | B2 | 3/2005 | Yamamoto et al. |
| 7,090,323 | B2 | 8/2006 | Takatsuka |
| 7,488,056 | B2 | 2/2009 | Torgerson et al. |
| 7,543,906 | B2 | 6/2009 | Benjamin et al. |
| 7,604,312 | B2 | 10/2009 | Wade |

(Continued)

*Primary Examiner* — Samuel P Siefke
(74) *Attorney, Agent, or Firm* — Brianna Schonenberg

(57) ABSTRACT

A fluid ejection head and a method of detecting the presence of fluid in an ejection chamber. The ejection head includes a semiconductor substrate having an elongate fluid supply via etched therethrough. An array of fluid ejectors is disposed adjacent to the fluid supply via, wherein the elongate fluid supply via provides fluid to the array of fluid ejectors for ejection of fluid from the ejection head. Fluid sense cells for the array of fluid ejectors are disposed at each end of the fluid supply via, wherein each of the fluid sense cells has a fluid ejector, an electrode disposed in a fluid chamber for the fluid ejector, and an electrode disposed in a fluid channel associated with a fluid chamber. A fluid detection circuit is provided in electrical communication with each of the fluid sense cells for detecting the presence or absence of fluid in the fluid chamber.

6 Claims, 9 Drawing Sheets

(56) References Cited

U.S. PATENT DOCUMENTS

| | | | |
|---|---|---|---|
| 7,722,144 B2 | 5/2010 | Benjamin et al. |
| 7,794,057 B2 | 9/2010 | Benjamin et al. |
| 8,172,358 B2 | 5/2012 | Inoue |
| 8,870,322 B2 | 10/2014 | Martin et al. |
| 8,899,709 B2 | 12/2014 | Govyadinov et al. |
| 9,452,604 B2 | 9/2016 | Brocklin et al. |
| 9,493,002 B2 | 11/2016 | Edelen et al. |
| 9,701,126 B2 | 7/2017 | Norasak |
| 9,744,771 B1 | 8/2017 | Anderson, Jr. et al. |
| 9,751,315 B1 | 9/2017 | Komplin et al. |
| 9,776,412 B2 | 10/2017 | Ge et al. |
| 9,850,891 B2 | 12/2017 | Edelen |
| 9,855,566 B1 | 1/2018 | Craft et al. |
| 9,878,553 B2 | 1/2018 | Norasak |
| 9,889,651 B2 | 2/2018 | Norasak |
| 9,889,670 B1 | 2/2018 | Komplin et al. |
| 9,902,158 B1 | 2/2018 | Komplin et al. |
| 9,937,725 B1 | 4/2018 | Komplin |
| 10,059,113 B2 | 8/2018 | Komplin et al. |
| 10,099,477 B2 | 10/2018 | Edelen et al. |
| 10,160,224 B2 | 12/2018 | Ge et al. |
| 10,201,970 B2 | 2/2019 | Goto et al. |
| 10,207,510 B2 | 2/2019 | Komplin et al. |
| 10,308,035 B2 | 6/2019 | Van Brocklin et al. |
| 10,632,749 B2 | 4/2020 | Govyadinov et al. |
| 10,717,279 B2 | 7/2020 | Edelen et al. |
| 10,807,373 B2 | 10/2020 | Ge et al. |
| 11,090,929 B2 | 8/2021 | Chen et al. |
| 11,571,691 B2 | 2/2023 | Carrithers et al. |
| 11,577,250 B2 | 2/2023 | Carrithers et al. |
| 11,577,513 B2 | 2/2023 | Weaver |
| 11,592,370 B2 | 2/2023 | Kozikowski, III et al. |
| 11,686,696 B2 | 6/2023 | Bergstedt et al. |
| 11,820,140 B2 | 11/2023 | Deboard et al. |
| 11,858,268 B1 | 1/2024 | Carrithers et al. |
| 11,896,971 B2 | 2/2024 | Bergstedt et al. |
| 11,926,157 B2 | 3/2024 | Weaver |
| 11,933,704 B2 | 3/2024 | Anderson, Jr. et al. |
| 12,011,933 B2 | 6/2024 | Carrithers et al. |
| 12,600,130 B2 | 4/2026 | Bernard et al. |
| RE50,886 E | 5/2026 | Deboard et al. |
| 12,623,452 B2 | 5/2026 | Deboard et al. |
| 2023/0364625 A1 | 11/2023 | Marra, III |
| 2024/0272041 A1 | 8/2024 | Carrithers |
| 2024/0280447 A1 | 8/2024 | Li et al. |
| 2024/0307907 A1 | 9/2024 | Gibson et al. |

FLUID DETECTION CIRCUIT FOR FLUID EJECTION HEAD

RELATED APPLICATION

This application is a continuation-in-part of U.S. application Ser. No. 17/205,016, filed Mar. 18, 2021, now allowed.

TECHNICAL FIELD

The disclosure is directed to a digital dispense devices and in particular to an electrical circuit and a method for determining the presence or absence of a fluid in a fluid chamber of fluid ejection head.

BACKGROUND AND SUMMARY

Fluid ejection heads have been used for a variety of printing applications. However, the fluid ejection heads are now finding uses in a variety of other areas such as drug delivery, micro-dosing and dispensing into micro-wells of a well plate, analytical slide preparation, vapor therapy, and the like. In the medical field, in particular, there is a need for automated sample preparation and analysis. The analysis may be colorimetric analysis or require the staining of samples to better observe the samples under a microscope. Such analysis may include drug sample analysis, blood sample analysis and the like. Assay analysis of blood, for example, provides a number of different factors that are used to determine the health of an individual. When there are a large number of patients that require blood sample analysis, the procedures may be extremely time consuming. For assay analysis, such as drug screenings, it is desirable to deposit miniscule amounts of target reagents to evaluate their effect and performance on the samples. Traditionally, pipettes—manually or electromechanically actuated—are used to deposit trace substances into these assay samples. The total volume of a test fluid produced for an assay is dictated by the ability to achieve a desired ratio of reagents with respect to the least of the reagents. Due to the small-scale volumetric limitations of pipettes, it is often necessary to create an excess of testing fluid to achieve the proper ratio of reagents.

It is well known that thermal inkjet technology is capable of precisely distributing picolitre-sized droplets of a jetting fluid. The precision and speed offered by inkjet technology makes it a promising candidate for increasing throughput of assay samples while decreasing the amount of wasted sample. In a conventional thermal-jet printer, a jetting fluid is typically prefilled into a printhead before reaching the end-user. However, it is impractical to use a prefilled cartridge in the life-sciences field where it is desirable to produce testing solutions on site.

Accordingly, a pipette-fillable cartridge may be used with the digital dispense system. Pipette-fillable cartridges are filled at the time of use with a pre-determined amount of fluid for performing a chemical assay of a sample. Since the amount of fluid to be dispensed is critical to the assay analysis being performed, it is important to know if a fluid and the right amount of fluid is pipetted into a fluid holding chamber of a pipette-fillable cartridge. If the chamber is devoid of fluid, or prematurely runs out of fluid before the assay is complete, there will be an absence of fluid in the ejection head fluid chambers. In order to determine if fluid is properly dispensed from the ejection head, a fluid detection circuit may be used. Conventional fluid detection circuits are useful for an ejection head containing a single fluid supply via for providing fluid to the fluid chambers of the ejection head wherein the status of a large number of fluid chambers is to be determined sequentially as the fluid ejectors in the fluid chambers are activated. However, when there is more than one fluid supply via in the ejection head, there is a need to determine if fluid is being provided to each of the fluid supply vias and fluid chambers associated with the fluid supply vias at the same time.

In view of the foregoing, embodiments of the disclosure provide a fluid ejection head and a method of detecting the presence of fluid in an ejection chamber. The ejection head includes a semiconductor substrate having an elongate fluid supply via etched therethrough. An array of fluid ejectors is disposed adjacent to the fluid supply via, wherein the elongate fluid supply via provides fluid to the array of fluid ejectors for ejection of fluid from the ejection head. A first fluid sense cell for the array of fluid ejectors is disposed at a proximal end of the fluid supply via, the first fluid sense cell having a first fluid ejector, a first electrode disposed in a first fluid chamber for the first fluid ejector, and a second electrode disposed in a first fluid channel associated with the first fluid chamber. A second fluid sense cell for the array of fluid ejectors is disposed at a distal end of the fluid supply via, the second sense cell having a second fluid ejector, a third electrode disposed in a second fluid chamber for the second fluid ejector, and a fourth electrode disposed in a second fluid channel associated with the second fluid chamber. The fluid ejection head contains at least one fluid sense cell on each end of the elongate fluid supply via, wherein the first electrode and the third electrode are electrically isolated from one another. A first fluid detection circuit is provided in electrical communication with the first fluid sense cell and second fluid detection circuit is provided in electrical communication with the second fluid sense cell. Each fluid detection circuit is configured to generate a bit having a value indicative of the presence or absence of fluid in the first or second fluid chambers respectively, wherein the fluid detection circuit further comprises a bias means configured to apply and remove a bias voltage to the first and second electrodes of the first fluid sense cell and the second fluid detection circuit further comprises a bias voltage to configured to apply and remove a bias voltage from the third and fourth electrodes of the second fluid sense cell. A digital circuit having multiple stages is configured to receive bits in parallel and to shift bits out in series to an ejection head controller, wherein each of the multiple stages receives a bit generated by the each fluid detection circuit.

In another embodiment, there is provided a fluid ejection head having at least two fluid supply vias etched through a semiconductor substrate for providing fluid to an array of fluid ejectors disposed adjacent to each of the at least two fluid supply vias. Each fluid ejector of the array of fluid ejectors has a fluid channel for directing fluid from each of the at least two fluid supply vias to a fluid chamber for ejection by the fluid ejection head. A first fluid sense cell having a first electrode is disposed in a first fluid channel and a second electrode attached to a first fluid ejector in a first fluid chamber associated with the first fluid channel. A second fluid sense cell having a third electrode is disposed in a second fluid channel and a fourth electrode attached to a second fluid ejector for a second fluid chamber associated with the second fluid channel for each of the at least two fluid supply vias. The first fluid sense cell is disposed at a proximal end of each of the at least two fluid supply vias, and the second fluid sense cell is disposed at a distal end of each of the at least two fluid supply vias. The fluid ejection head contains at least two fluid sense cells for each of the at least two fluid supply vias, wherein the second electrode and the fourth electrode are electrically isolated from one another. A first fluid detection circuit is provided in electrical communication with the first sense cell and a second fluid detection circuit is provided in electrical communication with the second fluid sense cell, where each of the first and second fluid detection circuits is configured to generate a bit having a value indicative of the presence or absence of fluid in the first or second fluid chambers, respectively. The first fluid detection circuit further comprises a bias means configured to apply and remove a bias voltage to first and second electrodes of the first fluid sense cell and the second fluid detection circuit further comprises a bias means configured to apply and remove a bias voltage to the third and fourth electrodes of the second fluid sense cell. A digital circuit having multiple stages is configured to receive bits in parallel and to shift bits out in series to an ejection head controller, wherein each of the multiple stages receives a bit generated by the first and second fluid detection circuits.

In another embodiment, there is provided a digital dispense system having a pipette fillable cartridge having a fluid containing chamber therein and a fluid ejection head is attached to the pipette fillable cartridge. The fluid ejection head includes a semiconductor substrate having an elongate fluid supply via etched therethrough. An array of fluid ejectors is disposed adjacent to the fluid supply via, wherein the elongate fluid supply via provides fluid to the array of fluid ejectors for ejection of fluid from the ejection head. Fluid sense cells for the array of fluid ejectors are disposed at each end of the fluid supply via, wherein each of the fluid sense cells has a fluid ejector, an electrode disposed in a fluid chamber for the fluid ejector, and an electrode disposed in a fluid channel associated with a fluid chamber. A fluid detection circuit is provided in electrical communication with each of the fluid sense cells for detecting the presence or absence of fluid in the fluid chamber. The array of fluid ejectors is in fluid flow communication with the fluid containing chamber. A controller is provided for controlling ejection of fluid from the fluid ejection head.

In some embodiments, the digital circuit is a parallel-in/serial-out shift register.

In some embodiments, the fluid sense cells is a conductivity sense circuit, wherein the conductivity sense circuit is configured to provide a digital high output when fluid is detected in the first or second fluid channel and the corresponding first or second fluid chamber and a digital low output when fluid is absent from the first or second fluid chamber.

In some embodiments, not all of the fluid ejectors in the array of fluid ejectors adjacent to the elongate fluid supply via contain a fluid sense cell.

In some embodiments, a latch circuit is provided for each fluid detection circuit for holding a digital bit from each of the first and second fluid detection circuits for transfer to the shift register.

In some embodiments, the fluid ejection head comprises at least three fluid supply vias, a fluid ejector array for each of the three fluid supply vias, and a fluid detection circuit for each fluid ejector array. In other embodiments, the fluid ejection head comprises at least four fluid supply vias, a fluid ejector array for each of the four fluid supply vias, and a fluid detection circuit for each fluid ejector array. In still other embodiments, the fluid ejection head comprises at least six fluid supply vias, a fluid ejector array for each of the six fluid supply vias, and a fluid detection circuit for each fluid ejector array.

An advantage of the disclosed embodiments is that it provides unique low-cost fluid detection circuit arrangement that can be used to determine if fluid from multiple fluid supply vias on an ejection head is being supplied to fluid chambers associated with fluid ejector arrays for each of the multiple fluid supply vias. Other advantages of the disclosed embodiments are that the multiple fluid detection circuits can be read in parallel, thus reducing the time required to obtain output from the fluid detection circuits on the ejection head.

DETAILED DESCRIPTION OF EXEMPLARY EMBODIMENTS

Figure 1:
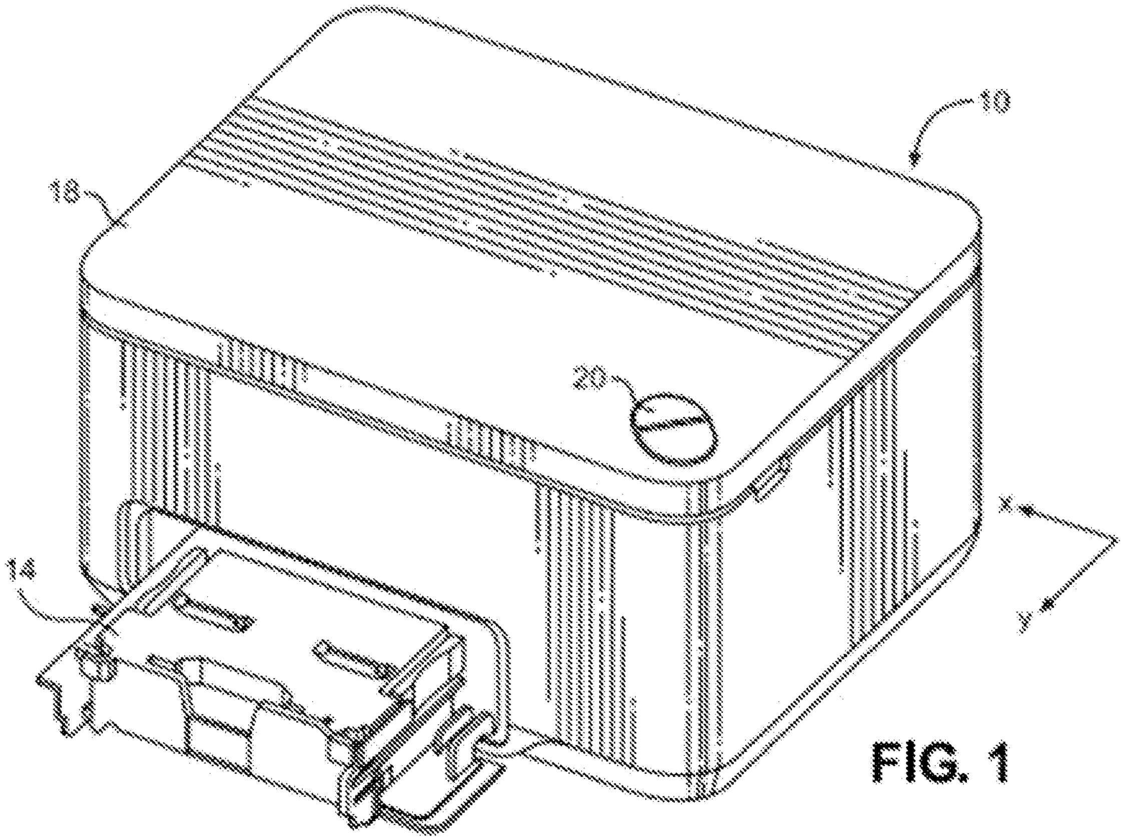
FIG. 1 is a perspective view, not to scale, of a digital dispense system according to an embodiment of the disclosure.
Figure 2:
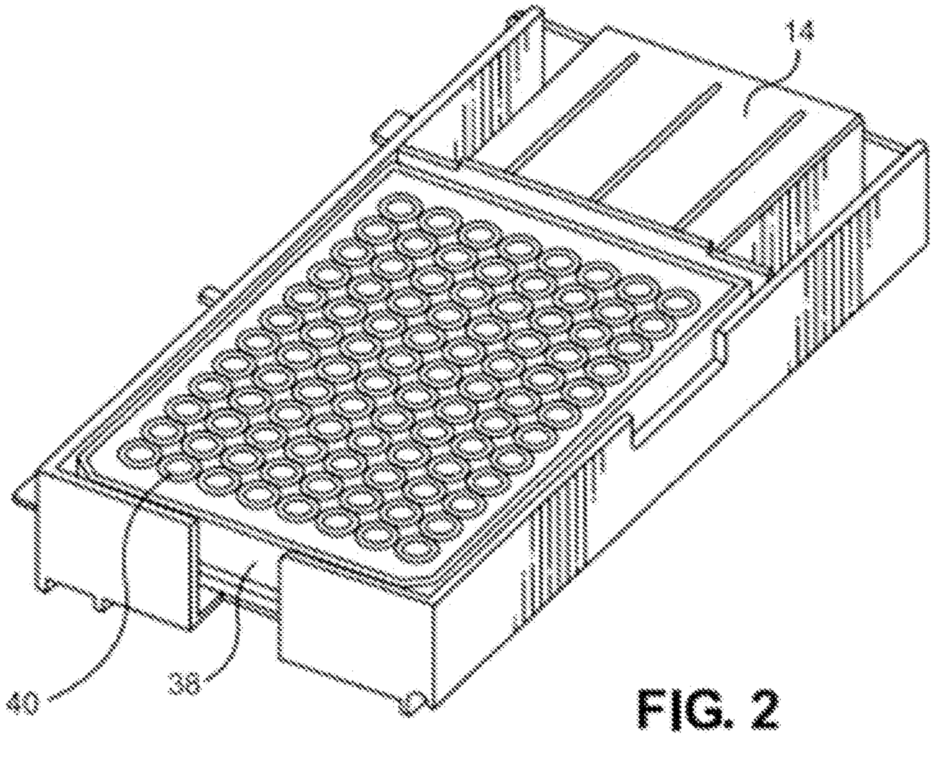
FIG. 2 is a perspective view, not to scale, of a tray and microwell plate for use with the digital dispense system of FIG. 1.

With reference to FIGS. 1-2 there is shown a digital dispense device 10 for accurately dispensing an amount of one or more fluids onto a substrate. The device 10 has an ejection head that moves back and forth in a first x direction and a tray 14 for moving a substrate that moves back and forth in a second y direction orthogonal to the first direction during the fluid dispense operation. The tray 14 is adaptable to a wide variety of substrates including, but not limited to, micro-well plates, glass slides, electronic circuit boards and the like. FIG. 2 illustrates a tray 14 for holding a micro-well plate 38 containing wells 40 therein for use with the digital dispense device 10 to dispense fluid into the wells 40 of the micro-well plate or onto the glass slides. The tray 14 may include adapters for different size micro-well plates or for holding slides or other substrates for deposit of fluid thereon.

The dispense head cartridge containing a fluid ejection head and a cartridge movement mechanism are contained in a rectangular prism-shaped box 18. An activation switch 20 is included on the box 18 for activating the device 10. A rear side of the box 18 includes an opening for movement of the tray 14 through the box 18 in the second direction to dispense fluid onto a substrate. A USB port is provided on the box 18 to connect the digital dispense system 10 to a computer or a digital display device. Power is provided to the system 10 through a power input port on the box 18.

Figure 3:
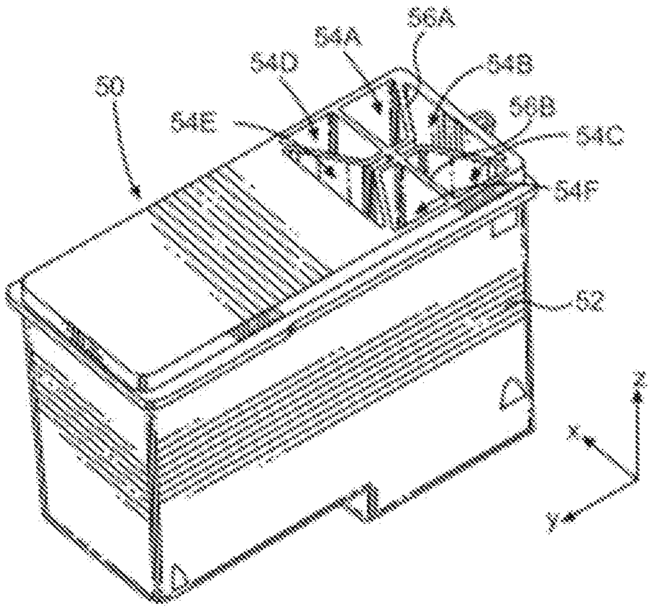
FIG. 3 is a perspective view, not to scale, of a pipette-fillable cartridge for use with the digital dispense system of FIG. 1.
Figure 4:
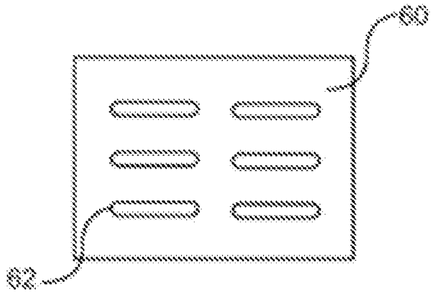
FIG. 4 is a plan view, not to scale, of an ejection head for the pipette-fillable cartridge of FIG. 3.
Figure 5:
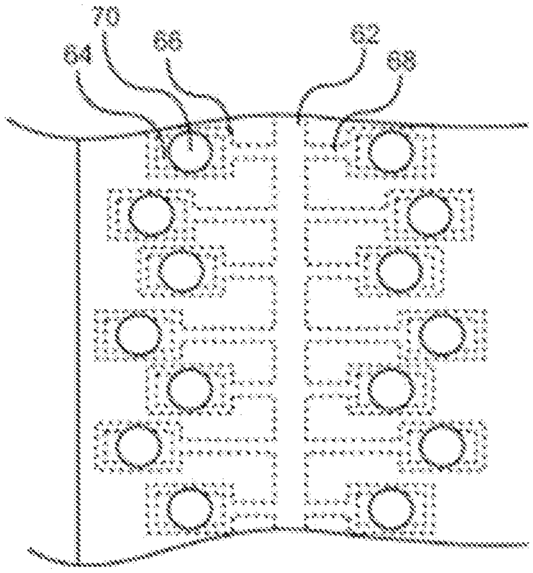
FIG. 5 is an enlarged plan view, not to scale of a portion of an ejector array on the ejection head of FIG. 4.

In some embodiments, a pipette-fillable cartridge 50 for use with the digital dispense device 10 of FIG. 1 is illustrated in FIG. 3. In other embodiments, a conventional fluid cartridge is used. The pipette-fillable cartridge 50 has a molded body 52 that provides one or more open fluid holding chambers 54*a*-54*f* therein. The fluid holding chambers 54*a*-54*f* are separated from one another by dividing walls 56A and 56B. Each of the fluid holding chambers 54*a*-54*f* is associated with a fluid supply via on an ejection head. With reference to FIG. 4, an ejection head 60 containing six fluid supply vias 62 is shown. Each of the fluid supply vias 62 is associated with an array of fluid ejectors that may be disposed on one or both sides of the fluid supply vias 62, as described in more detail below. A greatly magnified portion of the ejection head 60 is illustrated in more detail in FIG. 5. Each fluid supply via 62 provides fluid from one of the fluid holding chambers 54*a*-54*f* to arrays of fluid ejectors 64 disposed on one or both sides of the fluid supply via 62. The fluid ejectors are located in a fluid chamber 66. Fluid is provided from the fluid supply via 62 through a fluid channel 68 to the fluid chamber 66. Upon activation of the fluid ejector 64, fluid is dispensed through an ejection nozzle 70 to a substrate which may be the well 40 of the micro-well plate 38 or to a glass slide.

Figure 6:
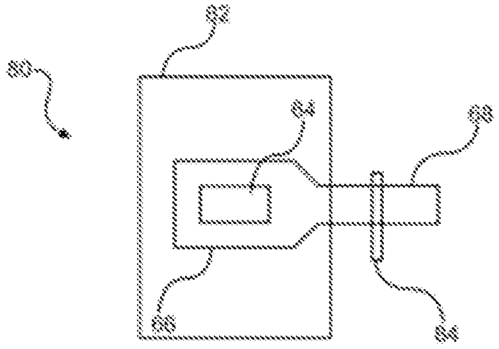
FIGS. 6 and 7 are schematic views not to scale of a fluid sensor for a fluid detection circuit without and with fluid according to an embodiment of the disclosure.

In order to determine if the fluid chambers 66 of the ejection head 60 contain fluid, a fluid detection circuit containing a fluid sense circuit may be used. The fluid sense circuit may be a conductivity detection device 80 as illustrated in a simplified plan view in FIG. 6 of a single fluid chamber 66 containing electrodes 82 and 84. Electrode 82 may be a tantalum protective layer disposed over the fluid ejector 64. A second electrode 84 is disposed in the fluid channel 68 for contact with fluid flowing from the fluid supply via 62 to the fluid ejection chamber 66. Each of the electrodes 82 and 84 may be made of a metal such as tantalum which is resistant to the fluids dispensed by the digital dispense device 10. Accordingly, any suitable metal may be used as electrodes 82 and 84.

Figure 7:
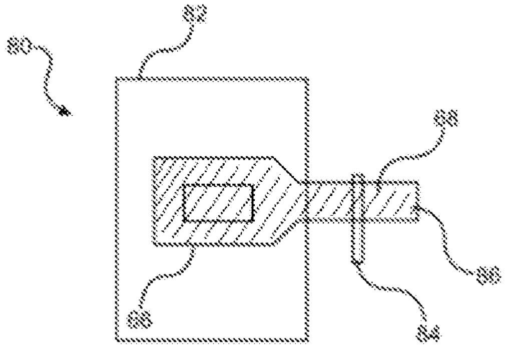
Figure 8:
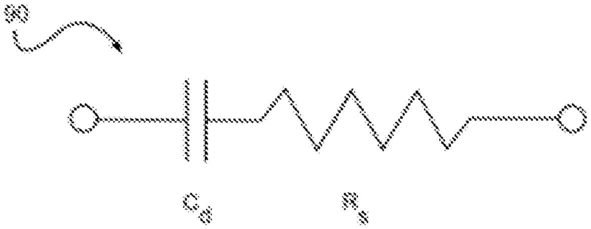
FIG. 8 is a schematic diagram of the fluid sensor of FIGS. 6 and 7.

FIG. 7 shows the conductivity detection device 80 in a steady state with the fluid chamber 66 and fluid channel 68 filled with fluid 86. As shown, the first electrode 82 and second electrode 84 are now fluidly connected by means of a conductive fluid 86. It is known from electrochemical principles that the relationship between the fluid and the first and second electrodes 83 and 84 can be represented by an electrical circuit 90 with a resistor, Rs, representing the solution resistance and the capacitor, Cd, representing the double layer capacitance formed at the electrode to fluid interface when biased as shown in FIG. 8. It should be understood that in the case where a conductive liquid is not present the double layer capacitor does not exist, and the series resistance would appear as an open circuit.

While the foregoing conductivity detection device 80 may be applied to all of the fluid ejectors in an array of fluid ejectors 64, a single conductivity detection device 80 may be used for each array of fluid ejectors 64. Accordingly, if fluid is not sensed by the conductivity detection device 80 for a single array of fluid ejectors, activation of all fluid ejectors for a single fluid supply via 62 may be terminated.

Figure 9:
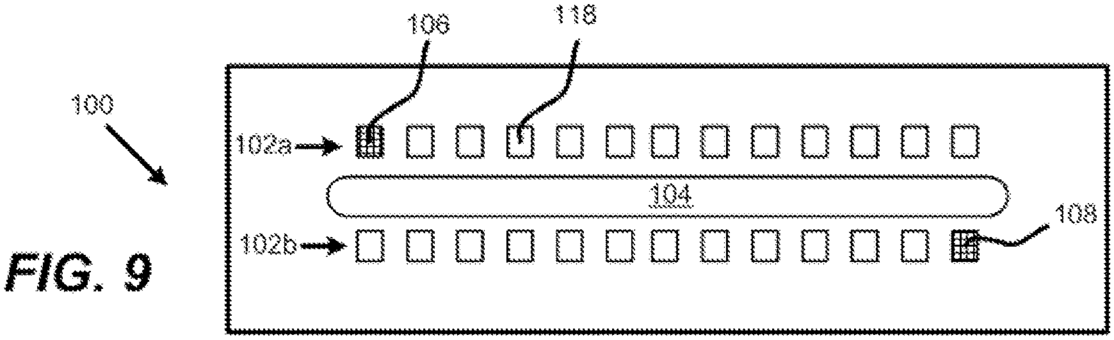
FIG. 9 is schematic plan view, not to scale, of an ejection head according to one embodiment of the disclosure.

FIGS. 9-13 are schematic illustrations of ejection heads containing multiple fluid supply vias, fluid ejectors associated with the fluid supply vias, and fluid sense circuits. FIG. 9 illustrates a fluid ejection head 100 containing arrays of fluid ejectors 102*a* and 102*b* disposed on both sides of an elongate fluid supply via 104. With relatively long fluid supply via 104, it may be useful to provide a fluid sense circuit for the fluid ejectors at a proximal end and at a distal end of the fluid supply via 104 as shown by the shaded squares. Accordingly, only fluid ejectors 106 and 108 will contain the electrodes 82 and 84 described above while the remaining fluid ejectors 118 (represented by the open squares) will be devoid of the electrodes 82 and 84.

Figure 10:
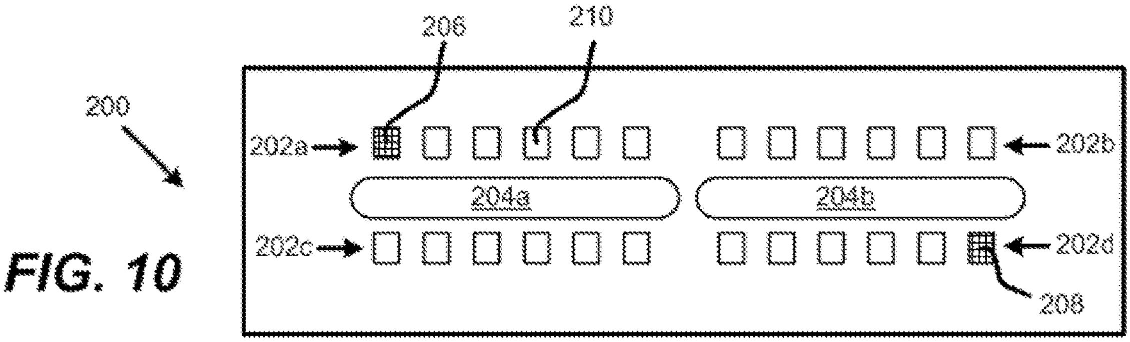
FIG. 10 is schematic plan view, not to scale, of an ejection head according to a second embodiment of the disclosure.

In some embodiments, there are multiple fluid supply vias and only a single fluid sense circuit is used for each fluid supply via. For Example, FIG. 10 illustrates an ejection head 200 having fluid ejector arrays 202*a*, 202*b*, 202*c*, and 202*d* disposed on opposing sides of fluid supply vias 204*a* and 204*b*. In this embodiment, only fluid ejectors 206 and 208 (shaded squares) for each of the fluid supply vias 204*a* and 204*b* contain the fluid detection electrodes 82 and 84 and the remaining fluid ejectors 210 (open squares) are devoid of the fluid detection electrodes.

Figure 11:
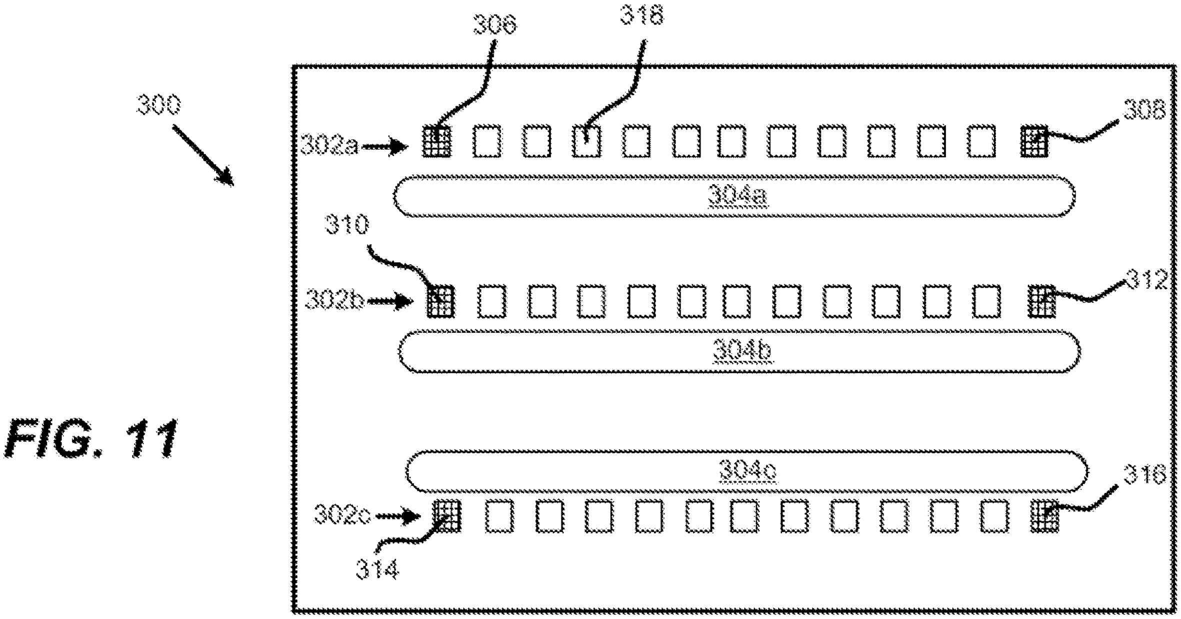
FIG. 11 is schematic plan view, not to scale, of an ejection head according to a third embodiment of the disclosure.

In some embodiments, the ejection head has multiple elongate fluid supply vias. FIG. 11 illustrates an ejection head 300 having ejector arrays 302*a*, 302*b*, and 302*c* disposed on only one side of elongate fluid supply vias 304*a*, 304*b*, and 304*c*, respectively. In this embodiment, only fluid ejectors 306, 308, 310, 312, 314, and 316 (shaded squares) contain the fluid detection electrodes 82 and 84 while the remaining fluid ejectors 318 (open squares) are devoid of the fluid detection electrodes.

Figure 12:
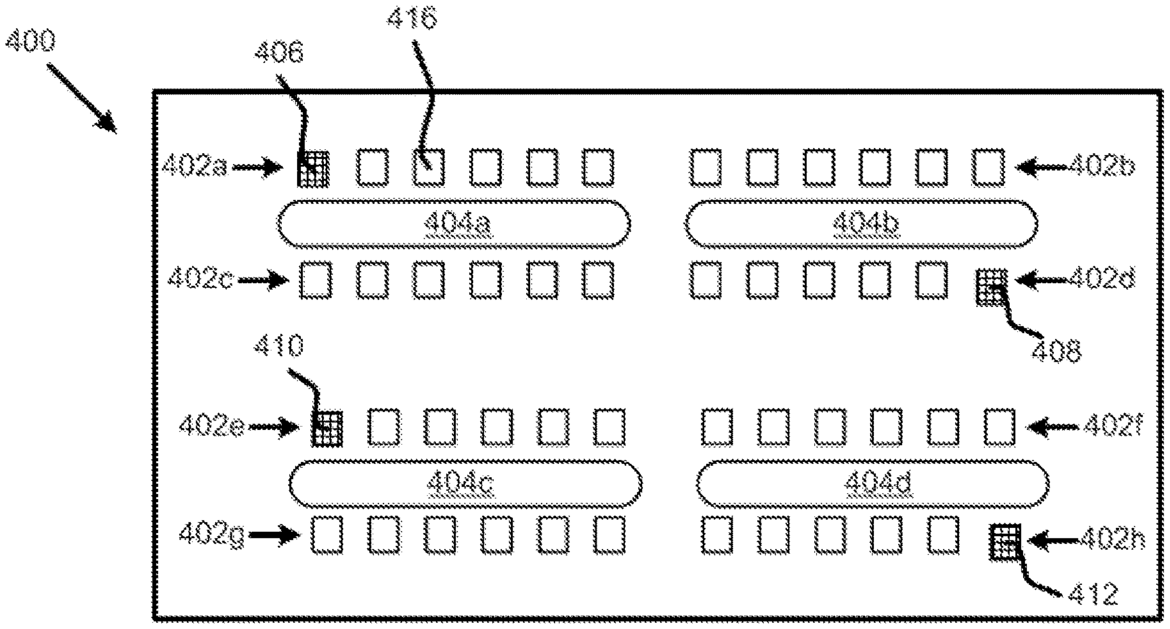
FIG. 12 is a schematic plan view, not to scale, of an ejection head according to a fourth embodiment of the disclosure.

In some embodiments, as illustrated in FIG. 12, the ejection head contains ejector arrays 402*a*, 402*b*, 402*c*, 402*d*, 402*e*, 402*f*, 402*g*, and 402*h* disposed on opposing sides of four fluid supply vias 404*a*, 404*b*, 404*c*, and 404*d*. In this embodiments, only one fluid ejector (406, 408, 410 and 412) for each of the fluid supply vias 404*a*-404*d* contains the fluid detection electrodes 82 and 84. The other fluid ejectors 416 are devoid of the fluid detection electrodes.

Figure 13:
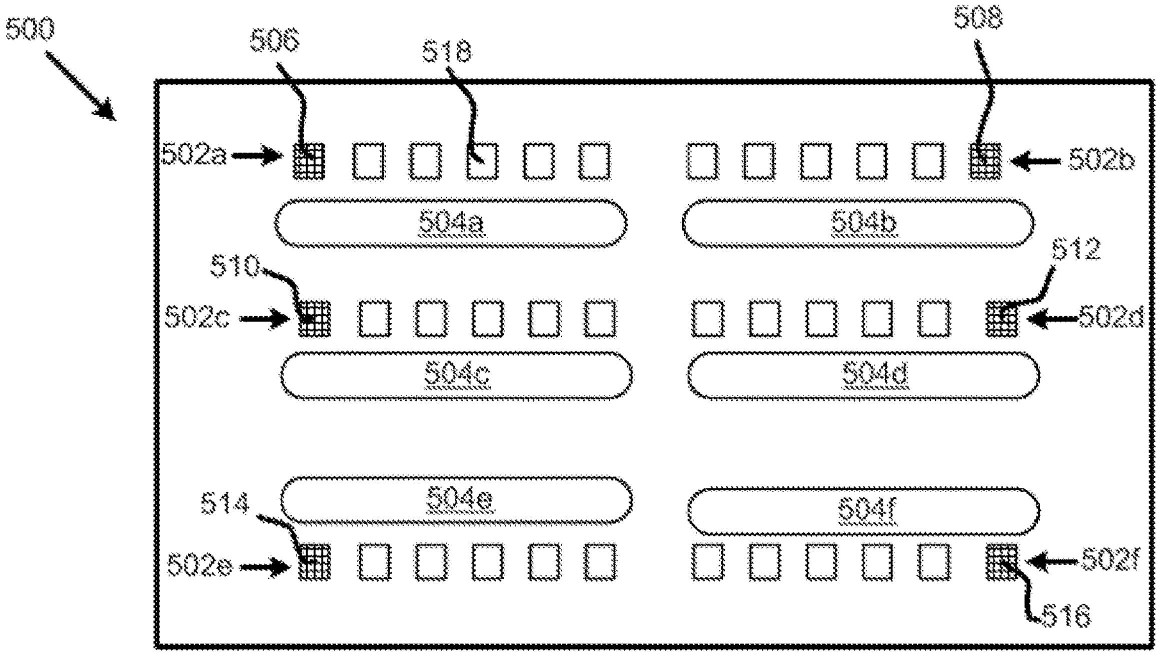
FIG. 13 is a schematic plan view, not to scale, of an ejection head according to a fifth embodiment of the disclosure.

FIG. 13 illustrates another fluid ejection head 500 having six fluid supply vias 504*a*, 504*b*, 504*c*, 504*d*, 504*e* and 504*f*, having a single ejector array 502*a*, 502*b*, 502*c*, 502*d*, 502*e*, and 502*f* for each of the fluid supply vias. Each ejector array contains a fluid sense cell 506, 508, 510, 512, 514, and 516 (shaded cells) having the fluid detection electrodes 82 and 84. The other fluid ejectors 518 are devoid of fluid sense cells.

In the embodiments illustrated in FIGS. 9-13, it is assumed that if a fluid ejector containing the fluid detection electrodes indicates the presence of fluid in the fluid chamber, then all of the fluid chambers in the same fluid ejector array are assumed to have fluid and thus are primed for ejection of fluid. However, if no fluid is detected by the fluid ejector containing the fluid detection electrodes, then it is assumed that none of the fluid chambers in the same fluid ejector array are primed for fluid ejection. In some embodiments, the fluid ejector containing the fluid detection electrodes is placed at one end of the fluid supply via. In other embodiments, the fluid ejector containing the fluid detection electrodes is placed at both ends of the fluid supply via. Thus, it is possible to determine if the fluid chambers in a fluid ejector array are primed for fluid ejection by using a minimal number of fluid detection devices and circuits therefor. The placement and number of fluid sense cells used will depend on the length of the fluid supply vias and the number of fluid supply vias in the ejection head.

Figure 14:
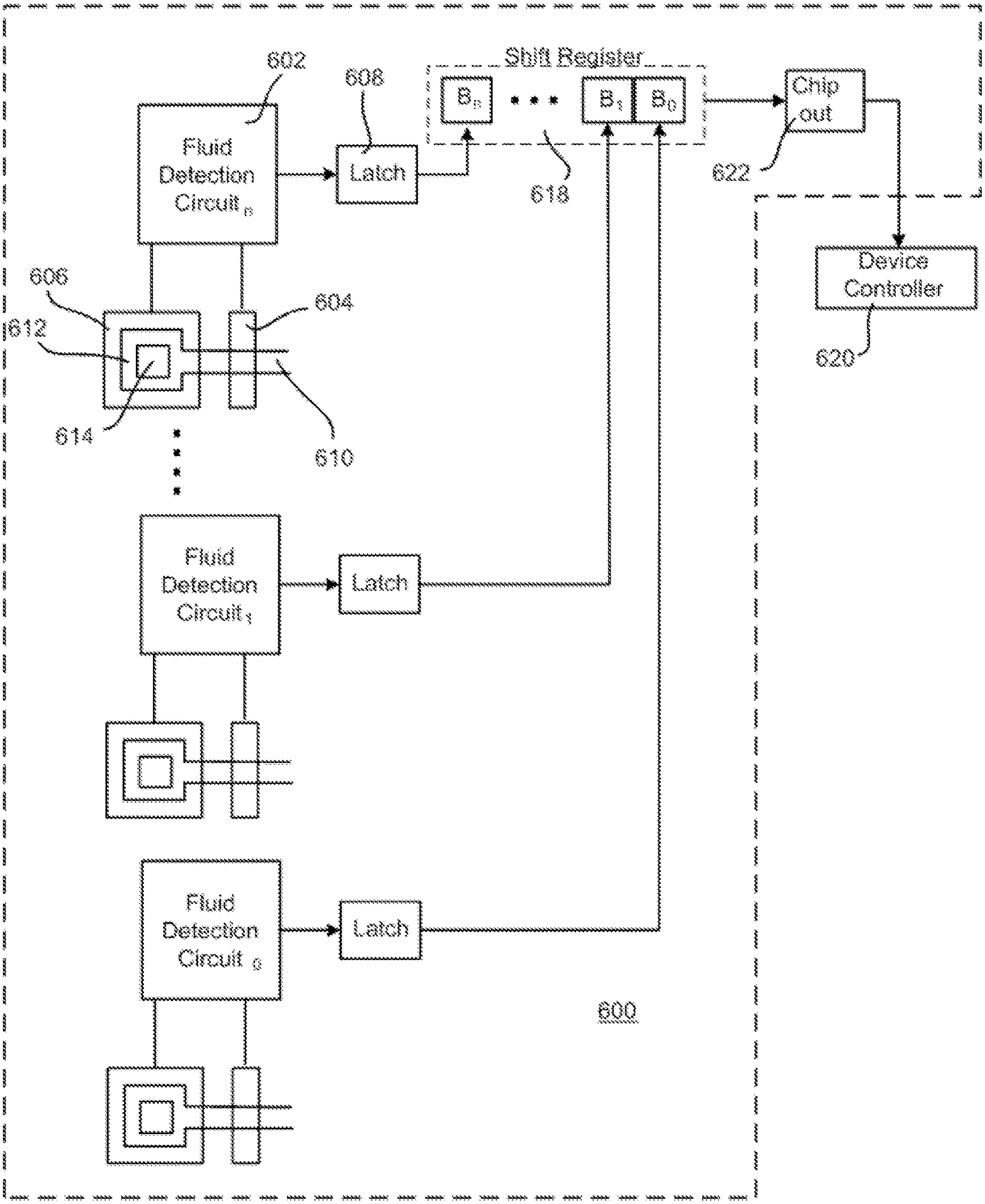
FIG. 14 is a schematic illustration of a fluid ejection head containing a fluid detection circuit according to an embodiment of the disclosure.
Figure 15:
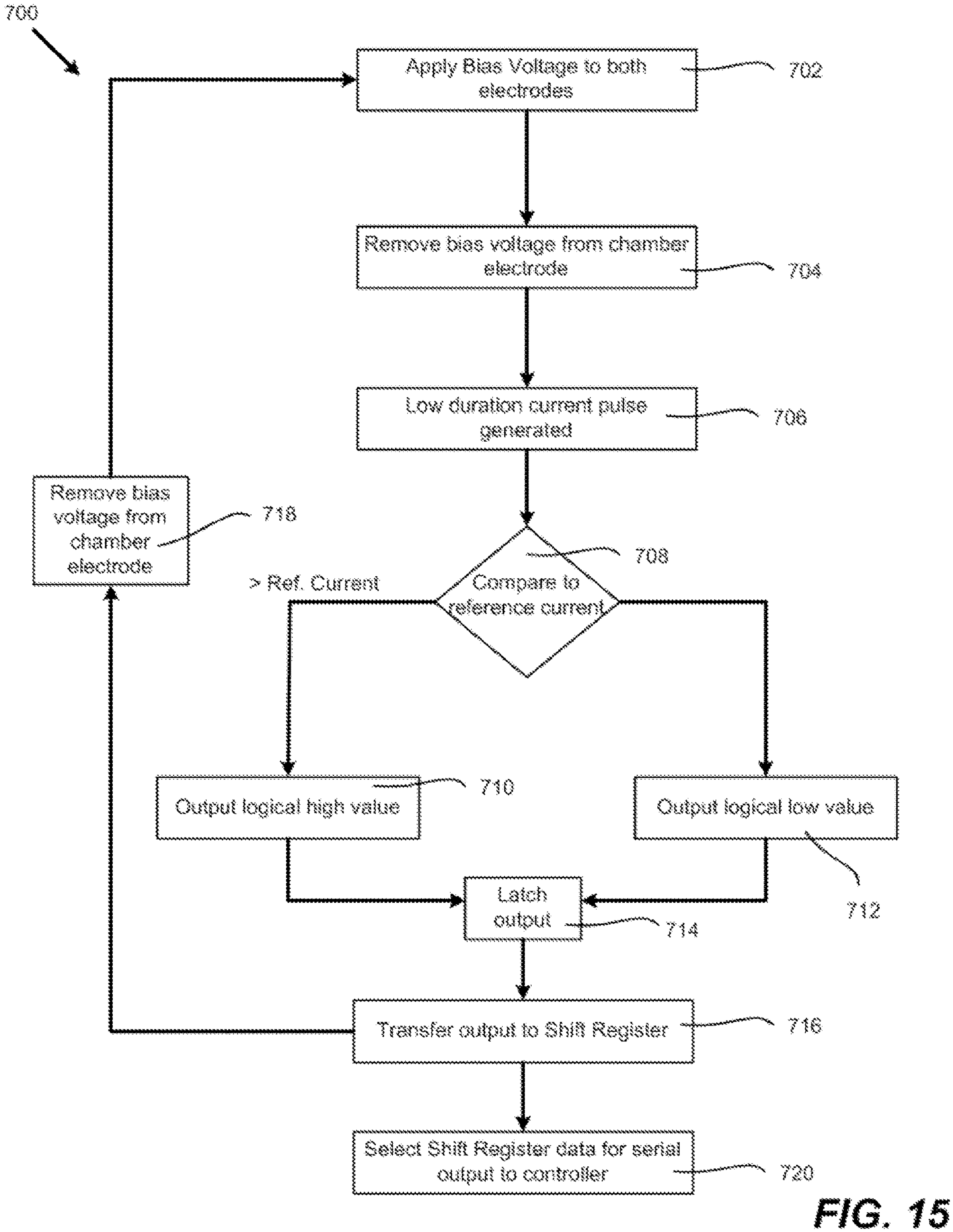
FIG. 15 is a process flow diagram for the fluid detection circuit of FIG. 12 according to embodiments of the disclosure.

FIG. 14 is a schematic illustration of a fluid ejection head 600 containing multiple fluid supply vias and multiple fluid detection circuits for the multiple fluid supply vias. Each fluid detection circuit 602 is associated with a fluid channel electrode 604, a fluid chamber electrode 606, and a latch circuit 608. The fluid channel electrode 604 is disposed in the fluid channel 610 that provides fluid from a fluid supply via to the fluid chamber 612 containing a fluid ejector 614. The fluid channel electrode 604 is in electrical communication with the fluid detection circuit 602 as shown. The fluid chamber electrode 606 is also in electrical communication with the fluid detection circuit 602 such that the presence of fluid across both electrodes can be detected by the fluid detection circuit 602. A digital output from the fluid detection circuit 602 is transferred to a latch circuit 608 so that the fluid detection circuit 602 can resample the fluid channel electrode 604 and fluid chamber electrode 606 without losing the previously generated output. The latch circuit 608 transfers the output values from the fluid detection circuit 602 to a digital circuit (such as a shift register 618) having multiple stages for receiving bits in parallel and shifting bits out in series to an ejection head controller 620, wherein each of the multiple stages receives a bit generated by the fluid detection circuit. Accordingly, as shown in FIG. 14 all digital outputs from the latch circuits on the ejection head are transferred in parallel to a different selected bit of the shift register 618. The bits $B_0$ to $B_n$ of the shift register are output from the ejection head to a device controller 620 through an output pad 622 on the ejection head 600.

FIG. 13 is an illustrative block flow diagram 700 for using the fluid detection circuit of FIG. 14 to determine if fluid is present in the fluid chambers of an ejection head. In the first step 702 of the process, a low duration current pulse may be generated by applying 0.9 volts to each of the channel electrode 604 and fluid chamber electrode 606 and then setting the voltage on the fluid chamber electrode to 0 volts in step 704 to generate a low duration current pulse in step 706. The fluid detection circuit 602 will sample the current generated by the change in voltage between the channel electrode 604 and fluid chamber electrode 606 and compare the magnitude of the current to a reference current in step 708. If the current pulse is greater than the reference current, the fluid detection circuit 602 will output a logical high value in step 710. Otherwise, the output from the fluid detection circuit 602 will remain at a logical low state in step 712. The output from the fluid detection circuit 602 is transferred to a latch circuit 608 in step 714. The latch circuit 608 for each of the fluid detection circuits 602 transfers the outputs in parallel to selected bits of a shift register 618 in step 716 so that the bias voltage from the chamber electrodes can be removed in step 718. The bits in the shift register 618 are output serially to the device controller 620 in step 720. If the controller 620 detects that fluid is present in the fluid chamber 612 of the ejection head 600, then all of the fluid ejectors on the ejection head 600 associated with the fluid supply via where fluid is detected by the fluid detection circuit 602 can be activated for ejecting fluid. If no fluid is detected by the fluid detection circuit 602, it is assumed that the fluid chambers 612 associated with the fluid detection circuit 602 and fluid supply via are not primed and thus the fluid ejectors 614 in the fluid ejector array will not be activated until the fluid chamber 612 associated with the fluid detection circuit 602 detects the presence of fluid.

Figure 16A:
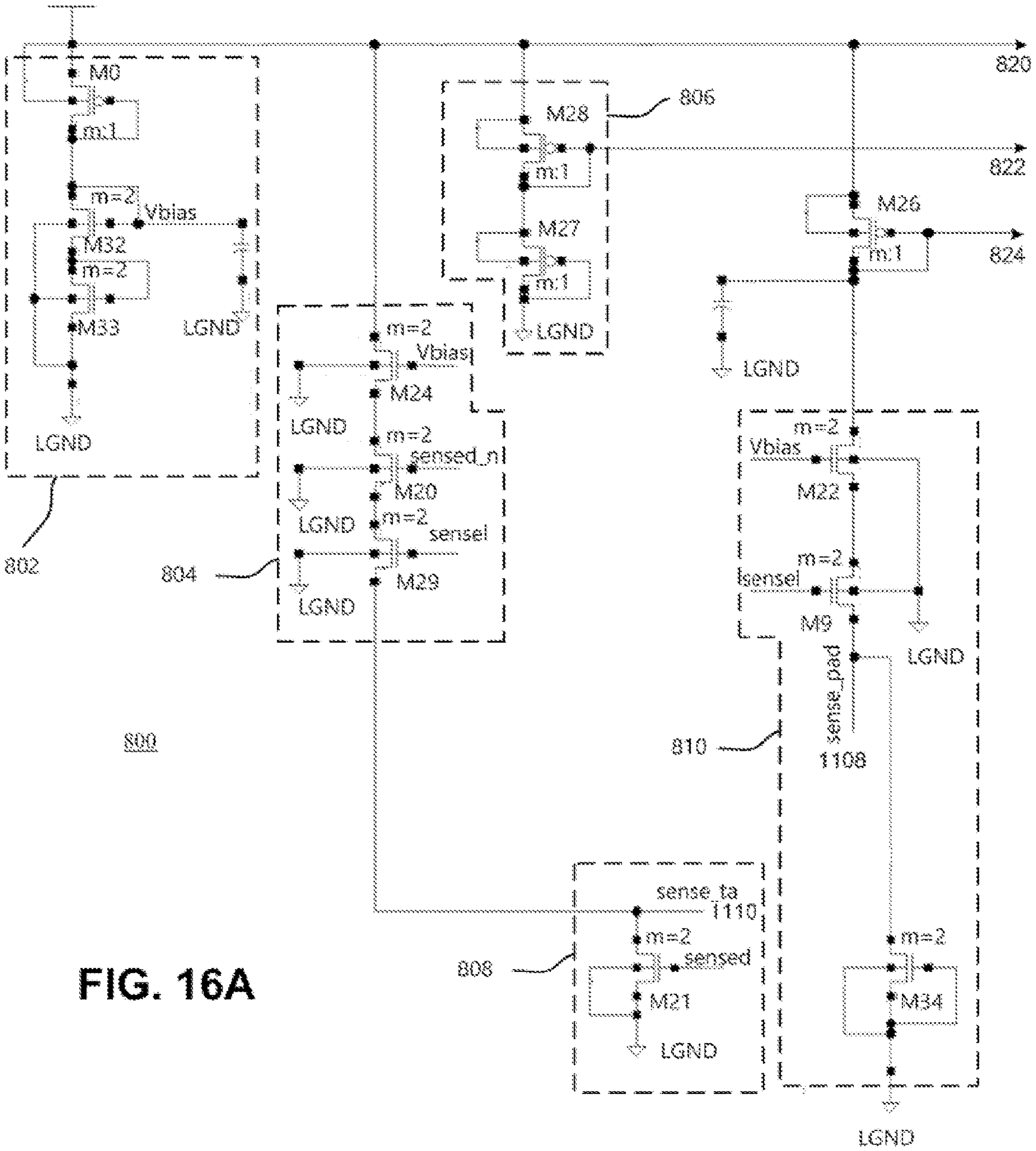
FIGS. 16A and 16B provide a schematic drawing of a fluid detection circuit according to an embodiment of the disclosure.
Figure 16B:
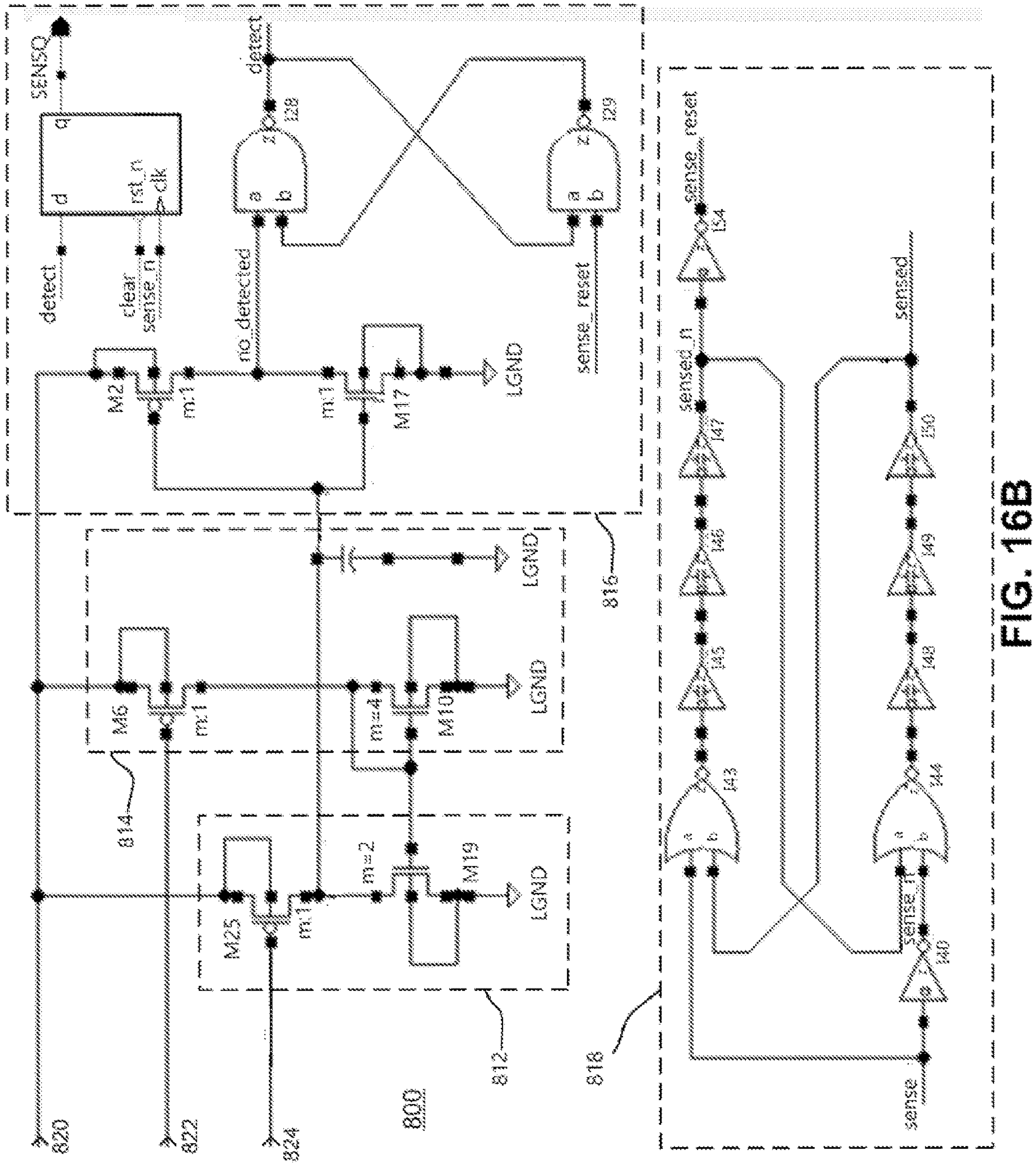

With reference now to FIGS. 16A and 16B, there are depicted six main parts of the fluid detection circuit 800 according to an embodiment of the disclosure. The fluid detection circuit 800 is sensitive to changes in the logic power (LPWR) voltage and includes the reference current circuits 806 and 814, the bias voltage reference 802, the sensor elements 804, 808, and 810 include a sense switch and a bias voltage limiter (Vbias), the clock signal generator 818, the current comparator 812, and the output latch and register 816. Each of these circuits is described in more detail below. Lines 820, 822, and 824 indicate the electrical connections between the arbitrarily-divided depictions of the circuit 800 in FIGS. 16A and 16B. Leads 1108 and 1110 are connected to the electrodes 82 and 84, respectively of the fluid sense cell.

The reference current circuits 806 and 814 generate a reference current that tracks with the voltage, and is widely adjustable. This allows for sensitivity adjustments for fluids that have different equivalent resistances, and provides a balance between noise immunity and sensitivity.

The bias voltage circuit 802 generates a voltage reference for the sensor elements 804, 808, and 810, and has a limiting behavior to make the bias voltage more constant with varying voltage. This allows the sensor elements 804, 808, and 810 voltage to be maximized without exceeding a desired limit, as large bias voltages may damage the sensor elements 804, 808, and 810 and prevent accurate detection of liquids.

The sense switches and the vias voltage limiter control of the sensor elements 804, 808, and 810 switch phases of the reference phase and compare the phase. In the reference phase, the pad is limited to the Vbias voltage, while in the compare phase the pad is connected to the logic ground (LGND). The sense pad is connected and limited to the Vbiasd voltage by leads 1108 and 1110 as given in FIG. 16A, in both the compare phase and the reference phase.

The clock generation circuit 818 generates non-overlapping clock signals. The reference phase signals and the compare phase signals are break-before-make type signals. This helps control sensor charging by making the sensor elements 804, 808, and 810 stabilize before comparison.

The current comparator circuit 812 detects by subtracting the reference current from the fluid sensed current in the compare phase. If the comparison voltage is greater than zero, then a fluid has been detected.

The output latch and register circuit 816 latches the detected comparison, and is then resettable for the next comparison operation. The output register holds the detection result until a new comparison is complete.

While the foregoing description provides a fluid detection circuit that uses fluid conductivity, the foregoing may also be adapted to a fluid detection circuit that is suitable for non-conductive fluids. In that case, a backup fluid detection circuit may also be included on the ejection head. The backup fluid detection circuit is provided where the fluid ejectors are thermal fluid ejectors that are used to heat the fluid and create a vapor bubble in the fluid chamber. The formation of a bubble on a surface of the thermal fluid ejector is detected based on the slope change in the current passing through the fluid ejector. If no fluid is present on the surface of the thermal fluid ejector, the rate at which the surface of the fluid ejector is heated will increase. By detecting a change in the rate of heating of the ejector surface, the presence or absence of fluid in the fluid chamber can be detected.

It will be appreciated that the foregoing description provides a system and method for minimizing the number of fluid sensors required to determine if fluid is present in the fluid chambers of an ejector array. The fluid sensors are compatible with multiple arrangements of fluid supply vias and the fluid detection circuit can activate all of the fluid sensors in parallel while serially reading the states of the fluid sensors. Since the number of sensors is minimized, the time required to determine if the fluid chambers are primed with fluid is also minimized.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A fluid ejection head comprising:

a semiconductor substrate having an elongate fluid supply via etched therethrough;

an array of fluid ejectors disposed adjacent to the fluid supply via, wherein the elongate fluid supply via provides fluid to the array of fluid ejectors for ejection of fluid from the ejection head;

a first fluid sense cell for the array of fluid ejectors disposed at a proximal end of the fluid supply via, the first fluid sense cell having a first fluid ejector, a first electrode disposed in a first fluid chamber for the first fluid ejector, and a second electrode disposed in a first fluid channel associated with the first fluid chamber;

a second fluid sense cell for the array of fluid ejectors disposed at a distal end of the fluid supply via, the second sense cell having a second fluid ejector, a third electrode disposed in a second fluid chamber for the second fluid ejector, and a fourth electrode disposed in a second fluid channel associated with the second fluid chamber, wherein the fluid ejection head contains at least one fluid sense cell on each end of the elongate fluid supply via, and wherein the first electrode and the third electrode are electrically isolated from one another;

a first fluid detection circuit in electrical communication with the first fluid sense cell and second fluid detection circuit in electrical communication with the second fluid sense cell, each fluid detection circuit being configured to generate a bit having a value indicative of the presence or absence of fluid in the first or second fluid chambers, respectively, wherein the first fluid detection circuit with is configured to apply and remove a first bias voltage to the first and second electrodes of the first fluid sense cell and the second fluid detection circuit configured to apply and remove a second bias voltage from the third and fourth electrodes of the second fluid sense cell; and a digital circuit having multiple stages configured to receive bits in parallel and to shift bits out in series to an ejection head controller, wherein each of the multiple stages receives a bit generated by the each fluid detection circuit.

2. The fluid ejection head of claim 1, wherein the digital circuit comprises a parallel-in/serial-out shift register.

3. The fluid ejection head of claim 1, wherein each of the fluid sense cells comprise a conductivity sense circuit, wherein the conductivity sense circuit is configured to provide a digital high output when fluid is detected in the first or second fluid channel and the corresponding first or second fluid chamber and a digital low output when fluid is absent from the first or second fluid chamber.

4. The fluid ejection head of claim 1, wherein not all of the fluid ejectors in the array of fluid ejectors adjacent to the elongate fluid supply via contain a fluid sense cell.

5. The fluid ejection head of claim 1, further comprising a latch circuit for each fluid detection circuit for holding a digital bit from each of the first and second fluid detection circuits for transfer to the shift register.

6. A digital dispense system comprising:

a pipette fillable cartridge having a fluid containing chamber therein and the fluid ejection head of claim 1 is attached to the pipette fillable cartridge, wherein the array of fluid ejectors is in fluid flow communication with the fluid containing chamber; and a controller for controlling ejection of fluid from the fluid ejection head.

* * * * *